(12) United States Patent
Forte (10) Patent No.: US 7,572,531 B2
(45) Date of Patent: Aug. 11, 2009

(54) FUEL REFORMER SYSTEM WITH IMPROVED WATER TRANSFER

(75) Inventor: Jameson R Forte, Webster, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 864 days.

(21) Appl. No.: 11/087,911

(22) Filed: Mar. 23, 2005
(Under 37 CFR 1.47)

(65) Prior Publication Data

US 2005/0260469 A1 Nov. 24, 2005

Related U.S. Application Data

(60) Provisional application No. 60/572,032, filed on May 18, 2004.

(51) Int. Cl.
*H01M 8/04* (2006.01)
*H01M 8/12* (2006.01)

(52) U.S. Cl. .......................................... 429/17; 429/26

(58) Field of Classification Search .................. 429/17, 429/26
See application file for complete search history.

(56) References Cited

U.S. PATENT DOCUMENTS

| | | | |
|---|---|---|---|
| 3,516,867 A | 6/1970 | Dankese | |
| 3,666,007 A | 5/1972 | Yoshino et al. | |
| 3,669,751 A | 6/1972 | Richman | |
| 3,865,924 A | 2/1975 | Gidaspow et al. | |
| 3,945,844 A | 3/1976 | Nickols, Jr. | |
| 4,037,024 A | 7/1977 | Landau | |
| 4,075,396 A | 2/1978 | Grehier | |
| 5,316,870 A | 5/1994 | Ohga | |
| 5,344,721 A | 9/1994 | Sonai et al. | |
| 5,401,589 A | 3/1995 | Palmer et al. | |
| 5,503,944 A | 4/1996 | Meyer et al. | |
| 5,542,259 A | 8/1996 | Worek et al. | |
| 5,542,968 A | 8/1996 | Belding et al. | |
| 5,573,866 A | 11/1996 | Van Dine et al. | |
| 5,660,048 A | 8/1997 | Belding et al. | |
| 5,851,689 A | 12/1998 | Chen | |
| 5,878,590 A | 3/1999 | Kadle et al. | |
| 6,007,931 A * | 12/1999 | Fuller et al. | .................. 429/13 |

FOREIGN PATENT DOCUMENTS

WO WO 99/05741 2/1999

* cited by examiner

*Primary Examiner*—Patrick Ryan
*Assistant Examiner*—Julian Mercado
(74) *Attorney, Agent, or Firm*—Harness, Dickey & Pierce, P.L.C.

(57) ABSTRACT

The present invention provides a hydrocarbon fuel reformer systems that improve the recovery and utilization of the water vapor and/or the heat energy within the reformer system. In a preferred embodiment, the present invention utilizes a desiccant matrix maintained in a water transfer assembly to collect, in a continuous manner, water from a process stream and transfer the water to a reactivation stream to return the water vapor to the reformer, with or without the use of a heat exchanger, and without requiring the collection and evaporation of liquid water.

20 Claims, 6 Drawing Sheets

FUEL REFORMER SYSTEM WITH IMPROVED WATER TRANSFER

CROSS-REFERENCE TO RELATED APPLICATIONS

This application claims the benefit of U.S. Provisional Application No. 60/572,032, filed on May 18, 2004, the disclosure of which is incorporated herein by reference.

FIELD OF THE INVENTION

This invention relates to reformer systems utilized for producing hydrogen from a hydrocarbon fuel, and more particularly to a reformer system having components configured to recover water vapor from a process gas stream and transfer the recovered water to a reactivation stream. Such reformer systems may be used to produce a hydrogen-rich reformate stream that becomes, in turn, the anode feed gas for a $H_2$—$O_2$ fuel cell stack.

BACKGROUND OF THE INVENTION $H_2$—$O_2$ fuel cells separate the hydrogen ($H_2$) fuel and an oxidant, typically oxygen from air, with an electrolyte. Within the fuel cell, the hydrogen gas separates into electrons and hydrogen ions (protons) at the anode. The hydrogen ions pass through the electrolyte to the cathode with the electrons traveling through a power circuit (e.g., to a motor) and returning to the cathode, where they combine with the hydrogen ions and oxygen to form water. The reaction rates at the anode and cathode are generally enhanced by a catalyst.

There are several broad types of fuel cells, each incorporating a different electrolyte system, and each having advantages that may make them particularly suited to given commercial applications. One type is the proton exchange membrane (PEM) fuel cell, which employs a thin polymer membrane that is permeable to protons but not electrons. PEM fuel cells, in particular, are well suited for use in vehicles, because they can provide high power and weigh less than other fuel cell systems.

For many applications, it is desirable to use a readily available hydrocarbon fuel, such as methane (natural gas), methanol, gasoline, or diesel fuel, as the source of the hydrogen that will be feed into the fuel cell. Such fuels are relatively easy to store, and there is an existing commercial infrastructure for their supply. Due in part to the established production, storage and distribution infrastructure, liquid fuels such as gasoline are particularly suited for vehicular applications. However, hydrocarbon fuels must be dissociated to release hydrogen gas for use in the fuel cell. Power plant fuel processors for providing hydrogen contain one or more reactors or "reformers" wherein the fuel reacts with steam, and sometimes air, to yield reaction products comprising primarily hydrogen and carbon dioxide.

The use of hydrocarbon reformate fuel cell systems in cars and other vehicles presents special concerns. In addition to the desirability of using readily available liquid fuels, discussed above, the reformer and fuel cell systems must be relatively light in weight, and must be able to operate efficiently under a wide range of ambient conditions (e.g., under a range of temperatures and humidity conditions). They should also exhibit good cold-start performance to produce power quickly, and respond quickly to varying system demands to provide the necessary power quickly. Thus, it is desirable to minimize the need for external heating of the reactants being fed into the reformer. It is also desirable to minimize the amount of liquid water that must be supplied to or handled within the system, to reduce or avoid the need to replenish system water and to reduce the complications associated with operations at temperatures below 0° C. (32° F.).

Typically, there are several components in the reformate fuel cell system that require water, particularly including the reformer (e.g., a steam reformer or autothermal reformer) that requires steam as a reactant and some carbon monoxide clean-up reactors (e.g., a water gas shift or WGS reactor), as well as the fuel cell that requires humidification of the MEA in order to function properly. A common approach to enhancing water balance in fuel cell systems incorporates a series of condensing heat exchangers at various points in the system. For example, a condensing heat exchanger may be positioned downstream of the reformer to cool the reformate to a temperature at or below its dew point and thereby condense a portion of the water vapor. The condensate water is then separated from the gaseous reformate and stored in a reservoir until it is returned to the reformer where it is heated to create steam. Heat exchangers have also been used to cool the cathode exhaust stream and condense water vapor that can then be used to humidify the MEA.

The use of multiple heat exchangers increases the complexity of the resulting reformer system. For example, the water recovery efficiency of heat exchangers is reduced as the ambient temperature increases. Similarly, large radiators may be required to dissipate the heat of condensation. Moreover, the liquid condensate produced by the heat exchangers must be vaporized before being fed back into the reformer or fuel cell, thereby creating an additional energy load and decreasing the overall efficiency of the system.

Various methods for addressing the water balance within fuel cell systems have been described in the art. See, for example, German Patent Disclosure 42 01632, Strasser, published Jul. 29, 1993; U.S. Pat. No. 6,007,931, Fuller et al., issued Dec. 28, 1999; and U.S. Pat. No. 6,013,385, DuBose, issued Jan. 11, 2000. However, water management systems among those known in the art do not adequately address these needs, due to problems such as their inability to maintain true water balance over a wide range of operating conditions, mechanical complexity, reliability concerns, and increased system energy requirements.

SUMMARY OF THE INVENTION

The present invention provides several embodiments for a hydrocarbon fuel reformer system that improves the recovery and utilization of the water vapor and/or the heat energy within the reformer system while decreasing or eliminating the need for handling liquid water. In particular, the present invention utilizes a desiccant to collect water vapor from a process stream and transfer the water to a reactivation stream that is then fed back into the reformer as an input stream, with or without the use of an additional heat exchanger. Accordingly, the present invention provides a fuel reformer system comprising a reformer and at least one water transfer assembly, preferably coupled with a fuel cell, a heat exchanger, and a combustor for maintaining an overall water balance in the system under a range of operating conditions, thereby reducing energy requirements and component complexity, and enhancing reliability.

DETAILED DESCRIPTION OF THE PREFERRED EMBODIMENTS

The present invention provides a hydrocarbon fuel processor, i.e., a device that converts a hydrocarbon fuel into a hydrogen-rich reformate, preferably for use with a fuel cell. The reformate is the gaseous product or effluent comprising hydrogen that is produced by a reactor from a hydrocarbon fuel. As referred to herein, a "fuel cell" may be a single cell for the electrochemical production of electricity, but will more typically comprise a series of PEM fuel cells using hydrogen as the fuel and oxygen from the air as the oxidant.

The membrane in the PEM fuel cell is part of a membrane electrode assembly (MEA) having the anode on one face of the membrane, and the cathode on the opposite face. The membrane is typically made from an ion exchange resin such as a perfluoronated sulfonic acid. The MEA is sandwiched between a pair of electrically conductive elements that serve as current collectors for the anode and cathode, and contain appropriate channels and/or openings for distribution of the fuel cell's gaseous reactants over the surfaces of the respective anode and cathode catalysts.

The anode and cathode typically comprise finely divided catalytic particles, supported on carbon particles, and admixed with a proton conductive resin. The catalytic particles are typically precious metal particles, such as platinum. Such MEAs are, accordingly, relatively expensive to manufacture and require controlled operating conditions in order to prevent degradation of the membrane and catalysts. These conditions include proper water management and humidification, and control of catalyst fouling constituents, such as carbon monoxide. Typical PEM fuel cells and MEAs are described in U.S. Pat. No. 5,272,017, Swathirajan et al., issued Dec. 21, 1993, and U.S. Pat. No. 5,316,871, Swathirajan et al., issued May 31, 1994, the contents of which are incorporated herein by reference.

The voltage from an individual fuel cell is only about 1 volt. Accordingly, to meet the higher power requirements of vehicles and other commercial applications, several cells are typically combined in series to increase the available voltage. This combination is typically arranged in a "stack" surrounded by an electrically insulating frame that has passages for directing the flow of the hydrogen and oxygen (air) reactants, and the water effluent. Because the reaction of oxygen and hydrogen also produces heat, the fuel cell stack must also be cooled. Arrangements of multiple cells in a stack are described in U.S. Pat. No. 5,763,113, Meltser et al., issued Jun. 9, 1998; and U.S. Pat. No. 6,099,484, Rock, issued Aug. 8, 2000, the contents of which are incorporated herein by reference.

A "hydrocarbon fuel cell plant" is an integrated apparatus that comprises both a fuel cell and a hydrocarbon fuel processor for providing a hydrogen-containing feed stream to the fuel cell. Preferably, the hydrocarbon fuel processor converts one or more hydrocarbon fuels, using an oxidant and water, to create a hydrogen-containing reformate stream. The range of hydrocarbon fuels is not generally limited and may include gasoline, diesel fuel, natural gas, methane, butane, propane, methanol, ethanol, or mixtures thereof. For example, in a steam reformation process, a hydrocarbon fuel (such as methanol) and water (as steam) are ideally reacted in a catalytic reactor (commonly referred to as a "steam reformer") to generate a reformate gas comprising primarily hydrogen and carbon monoxide. An exemplary steam reformer is described in U.S. Pat. No. 4,650,727 to Vanderborgh, the contents of which are incorporated herein by reference. For another example, in an autothermal reformation process, a hydrocarbon fuel (such as gasoline), air and steam are ideally reacted in a combined partial oxidation and steam reforming catalytic reactor (commonly referred to as an autothermal reformer or ATR) to generate a reformate gas containing hydrogen and carbon monoxide. An exemplary autothermal reformer is described in U.S. application Ser. No. 09/626,553 filed Jul. 27, 2000, the contents of which are incorporated herein by reference. The reformate exiting the reformer, however, contains undesirably high concentrations of carbon monoxide, most of which must be removed to avoid poisoning the catalyst of the fuel cell's anode.

There are also reformer designs that can operate in a variety of modes depending on the demands placed on the reformer/fuel cell system, thereby improving the efficiency of the reformer system while maintaining an ability to provide a rapid cold-start response and to respond quickly to varying loads. One such quasi-autothermal reformer (QATR) is described in U.S. patent application Ser. No. 10/788,155, filed Feb. 26, 2004, the contents of which are incorporated herein by reference, and provides for modes of operation between those that can be obtained with a pure autothermal reformer (ATR) or pure steam reformer by integrating thermal and catalytic combustors with a steam reforming portion. However, the QATR, like the steam reformer and the ATR, tends to produce a reformate that contains undesirably high concentrations of carbon monoxide.

In this regard, the relatively high level of carbon monoxide (i.e., about 3-10 mole %) contained in the $H_2$-containing reformate exiting the primary reformer reactor must be reduced to very low concentrations (e.g., less than 200 ppm, and typically less than about 20 ppm) to avoid poisoning the anode catalyst. Thus, reactors downstream of the primary reactor are typically utilized to lower the carbon monoxide concentration to tolerable levels. Such downstream reactors may include a water/gas shift (WGS) reactor and a preferential oxidizer (PrOx) reactor. The WGS reactor catalytically converts carbon dioxide and water to hydrogen and carbon dioxide. The PrOx reactor selectively oxidizes carbon monoxide to produce carbon dioxide, using oxygen from air as an oxidant. Control of air feed to the PrOx reactor is important to selectively oxidize carbon monoxide, while minimizing the oxidation of hydrogen to water.

In a preferred embodiment, the hydrocarbon fuel cell plant is suitable for use in a motor vehicle. In other preferred embodiments, the hydrocarbon fuel cell plant is suitable for use in stationary and typically larger applications, such as an emergency or supplemental power generator for home or commercial use.

Figure 1:
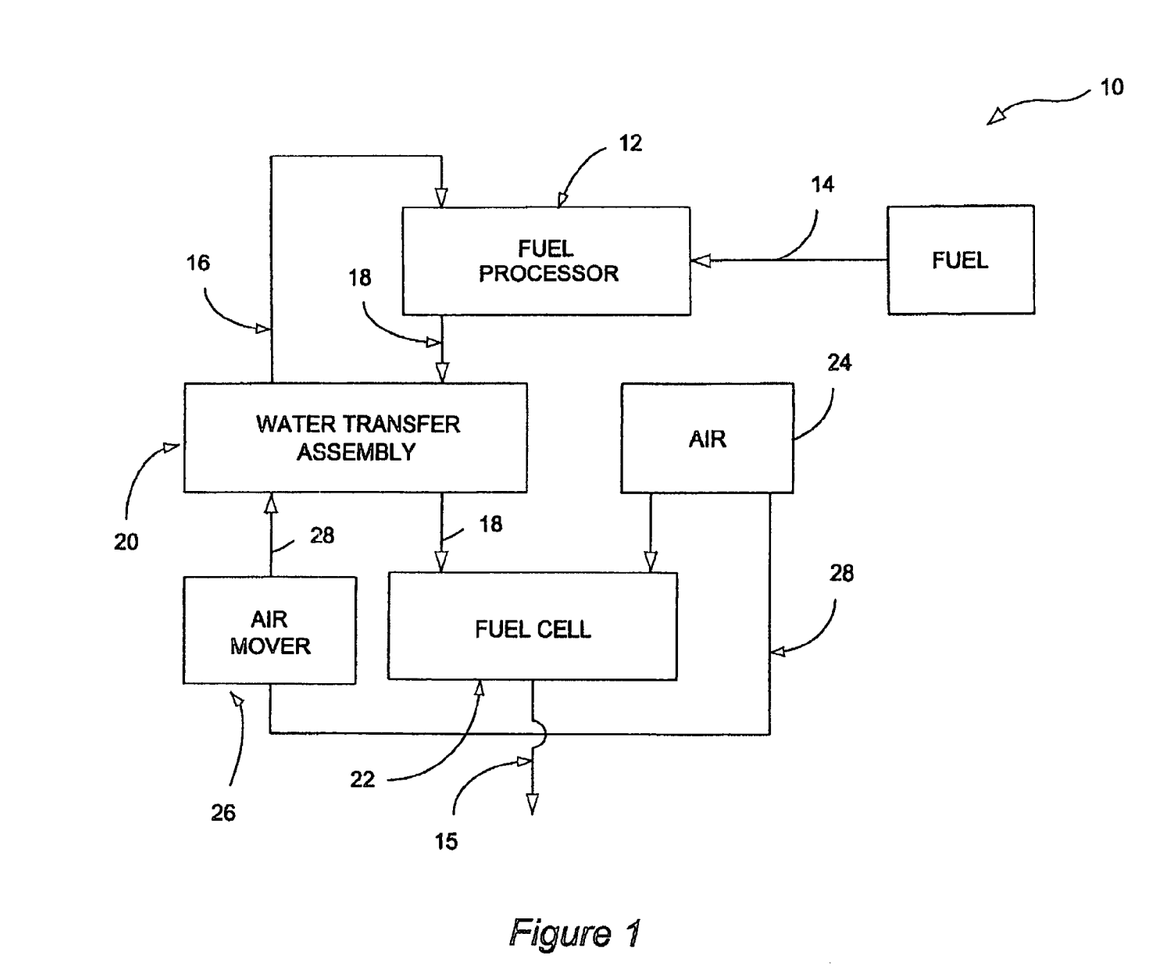
FIG. 1 is a diagram depicting a first embodiment of a hydrocarbon fuel reformer system according to the present invention connected to a fuel cell and showing basic process flow within the system.

In particular, with reference now to the drawing and to FIG. 1, a first embodiment of the present invention provides a hydrocarbon fuel cell plant 10 comprising a fuel processor 12 for reacting a hydrocarbon fuel feed stream 14 and an oxidant feed stream 10 to produce a hydrogen-containing reformate stream 18. This first embodiment also includes a water transfer assembly 20 arranged to transfer water vapor from the reformate stream 18 exiting the fuel processor 12 to one of the input streams 16 being fed into the fuel processor. As illustrated in FIG. 1, the reformate stream 18, after passing through the water transfer assembly 20, is fed into to a fuel cell 22. Also in this embodiment, the water vapor is preferably returned to the fuel processor 12 as part of the oxidant stream 16 supplied from an air source 24, typically pressurized by a compressor 26. The increase in temperature caused by compressing the air increases the effectiveness of the dry oxidant feed stream 28 as the reactivating stream in the water transfer assembly. The humidified oxidant stream feed 16 may be transferred directly to a fuel processor input or to an intermediate device which is, in turn, connected to a fuel processor input.

The water transfer assembly 20 preferably comprises a strong, non-shedding, non-toxic and non-corrosive desiccant matrix comprising a substrate with desiccant coating or embedded in the substrate. Further, the water transfer assembly 20 preferably comprises a moveable desiccant matrix that is moved in a manner to alternately expose portions of the desiccant matrix to a process stream containing water vapor, from which the desiccant absorbs water, and then exposed to a dry reactivation stream that desorbs water from the desiccant to humidify the reactivation stream and to prepare (reactivate) the desiccant for further absorption. As presently preferred, at least 85% of the water vapor for the combustion stream is transferred to the oxidant stream within the water transfer assembly.

Figure 2:
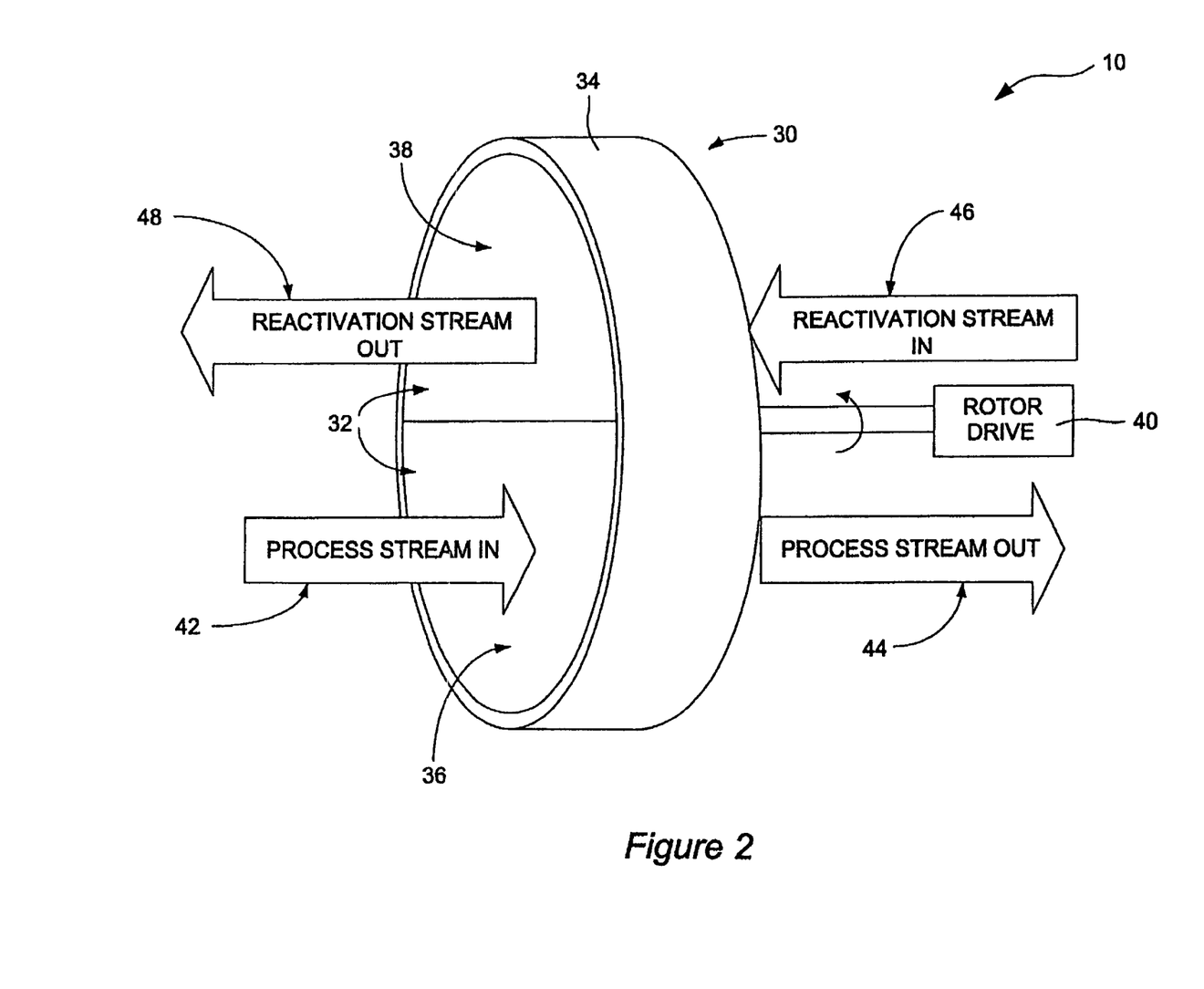
FIG. 2 is a diagram illustrating the operation of a preferred embodiment of the water transfer assembly.

One such water transfer assembly 20 is illustrated in FIG. 2 and comprises a desiccant rotor 30 comprising a desiccant matrix 32 contained in a casing 34 that selectively and sequentially exposes portions of the desiccant matrix in either a process zone 36 or a reactivation zone 38. A rotor drive 40 rotates the desiccant matrix 32 through the process zone 36 and reactivation zone 38. The rotor drive 40 is operable to move the rotor 30 at a variable rate such that movement of the desiccant matrix 32 through the process zone 36 may be adjusted. In the process zone 38, a high moisture process stream 42 is drawn through the desiccant matrix 32 in the process zone 36 and a portion of the water vapor is absorbed onto the desiccant matrix 32 and a dried process stream 44 is discharged and forms at least a portion of the oxidant feed stream 16.

A portion of the desiccant matrix 32 with the absorbed water then rotates from the process zone 36 into the reactivation zone 38 where a dry reactivation stream 46 is drawn or forced through the desiccant matrix 32 causing a portion of the water to desorb, thereby drying (or reactivating) the desiccant matrix 32 and producing a wet reactivation stream 48. A portion of the reactivated desiccant matrix 32 then rotates from the reactivation zone 38 into the process zone 36 where the cycle begins again. The rate of rotation of the desiccant rotor 30, as well as the relative desiccant areas exposed in the process zone 36 and the reactivation zone 38 can be adjusted to accommodate variations in the process and reactivation streams 42, 46 and the desired water transfer rate.

Although in the preferred embodiment the water transfer process is continuous, a batch or other non-continuous method could also be used. Similarly, although FIG. 2 illustrates a counter-flow for the process and reactivation streams, the effective segregation of the process and reactivation zones on the desiccant rotor by the casing render counter-flow and co-flow configurations equally viable, providing some additional design flexibility.

The desiccant matrix 32 area is characterized by an area substantially equal to the sum of the process zone area and the reactivation zone area. The ratio of the process zone area to the reactivation zone area are within the range of about 3:1 to 1:3. The desiccant matrix 32 preferably has a large surface area covered with both macropores and micropores. The actual desiccant can be embedded within or bonded to a high surface area-to-volume matrix structure, which may comprise a hexagonal "honeycomb" construction to define flow channels through the matrix. During the adsorption step, the process stream 42 is drawn or forced over the surfaces of the desiccant matrix 32 allowing a portion of the water vapor from the process stream 42 to attach to the desiccant as a quasi-liquid layer in a generally adiabatic process. Conversely, during the desorption step, a dry heated reactivation stream 46 is drawn or forced over the surfaces of the desiccant matrix 32, thereby heating the desiccant and causing the water stored in the desiccant to desorb and enter the reactivation stream 48 as water vapor.

A variety of desiccants may be used in the desiccant matrix including lithium chloride, metal silicate (silica gel) and advanced silica gels having increased numbers of available hydroxyl groups and micropores. Similarly, a variety of substrates may be used to support the desiccant including ceramic papers that can be treated to remove substantially all organic components and render them more suitable for high-temperature operations. The selection of the desiccant and substrate combination, as well as the sizing of the water transfer assembly, for a particular application will necessarily be guided by the operating parameters, performance and cost goals for the overall system.

Figure 3:
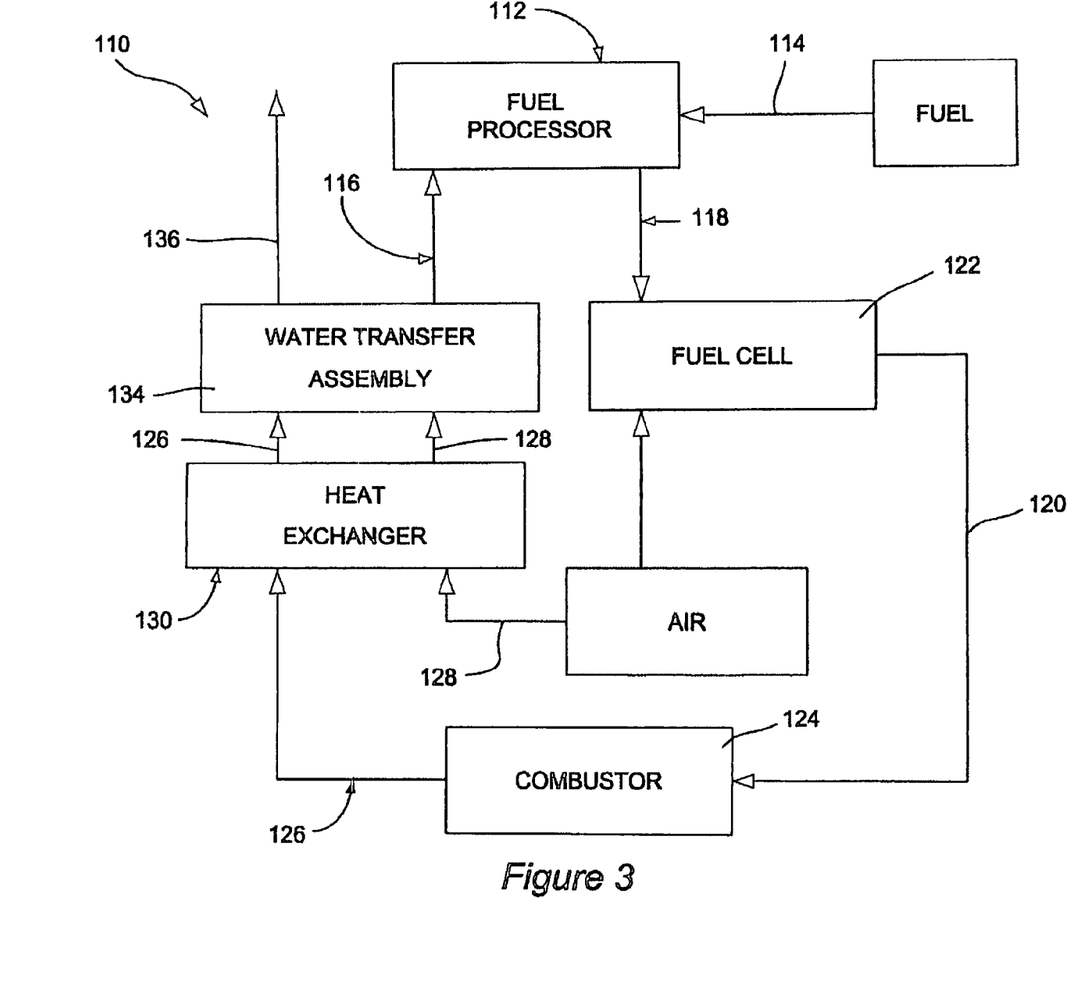
FIG. 3 is a diagram depicting a second embodiment of a hydrocarbon fuel reformer system according to the present invention connected to a fuel cell including a heat exchanger and providing an alternative process flow within the system.

A second embodiment is illustrated in FIG. 3. This second embodiment again provides a hydrocarbon fuel cell plant 110 comprising a fuel processor 112 for reacting a hydrocarbon fuel feed stream 114 and an oxidant feed stream 116 to produce a hydrogen-containing reformate stream 118. In the second embodiment, the exhaust stream 120 from the fuel cell 122 is fed into a combustor 124 in order to consume any residual hydrogen or fuel vapor and produce a hot, wet combustor exhaust stream 126. This combustor exhaust stream 126 is, in turn, fed into a heat exchanger 130 in which the exhaust stream 126 is cooled. An oxidant (air) stream 128 is also fed to the heat exchanger 130 in which the oxidant stream 128 is heated. The cooled combustor exhaust stream 126 and the heated oxidant stream 128 are then both fed into a water transfer assembly 134. Water is adsorbed by the water transfer assembly 134 from the cooled combustor exhaust stream 126 to produce a dry exhaust stream 136. Water is desorbed from the water transfer assembly 134 into the oxidant stream 128 to produce a wet oxidant stream 116 that is fed into the fuel processor 112. The dry combustor exhaust stream 136 may then be discharged into the environment.

Figure 4:
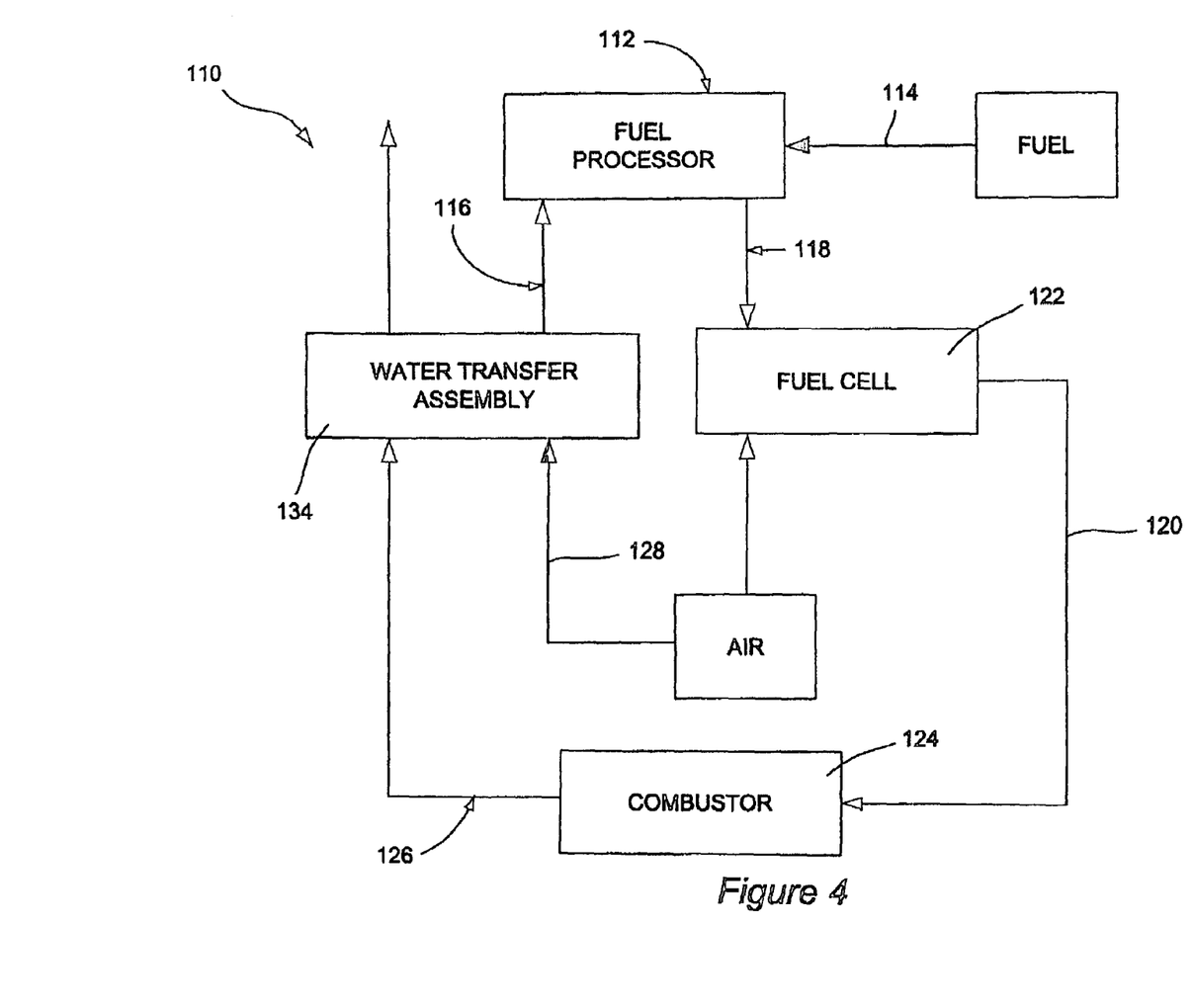
FIG. 4 is a diagram depicting a third embodiment of a hydrocarbon fuel reformer system according to the present invention connected to a fuel cell similar to that in FIG. 3, but without the heat exchanger.

A third embodiment is illustrated in FIG. 4. This third embodiment again provides a hydrocarbon fuel cell plant 110 comprising a fuel processor 112 for reacting a hydrocarbon fuel feed stream 114 and an oxidant feed stream 116 to produce a hydrogen-containing reformate stream 118. As in the second embodiment, the exhaust stream 120 from the fuel cell 122 is fed into a combustor 124 to consume any residual hydrogen or fuel vapor and produce a combustor exhaust stream 126. In this third embodiment, the combustor exhaust stream 126 and an oxidant stream 128 are then both fed directly into a water transfer assembly 134. The oxidant stream 128 is preferably heated, either as the result of compressing the air or by passage through a heat exchanger (not shown) before entering the water transfer assembly 134. In the water transfer assembly 134, water vapor from the combustor exhaust 126 is again transferred to the oxidant stream 128 to produce a wet oxidant stream 116 that is fed into the fuel processor 112.

Figure 5:
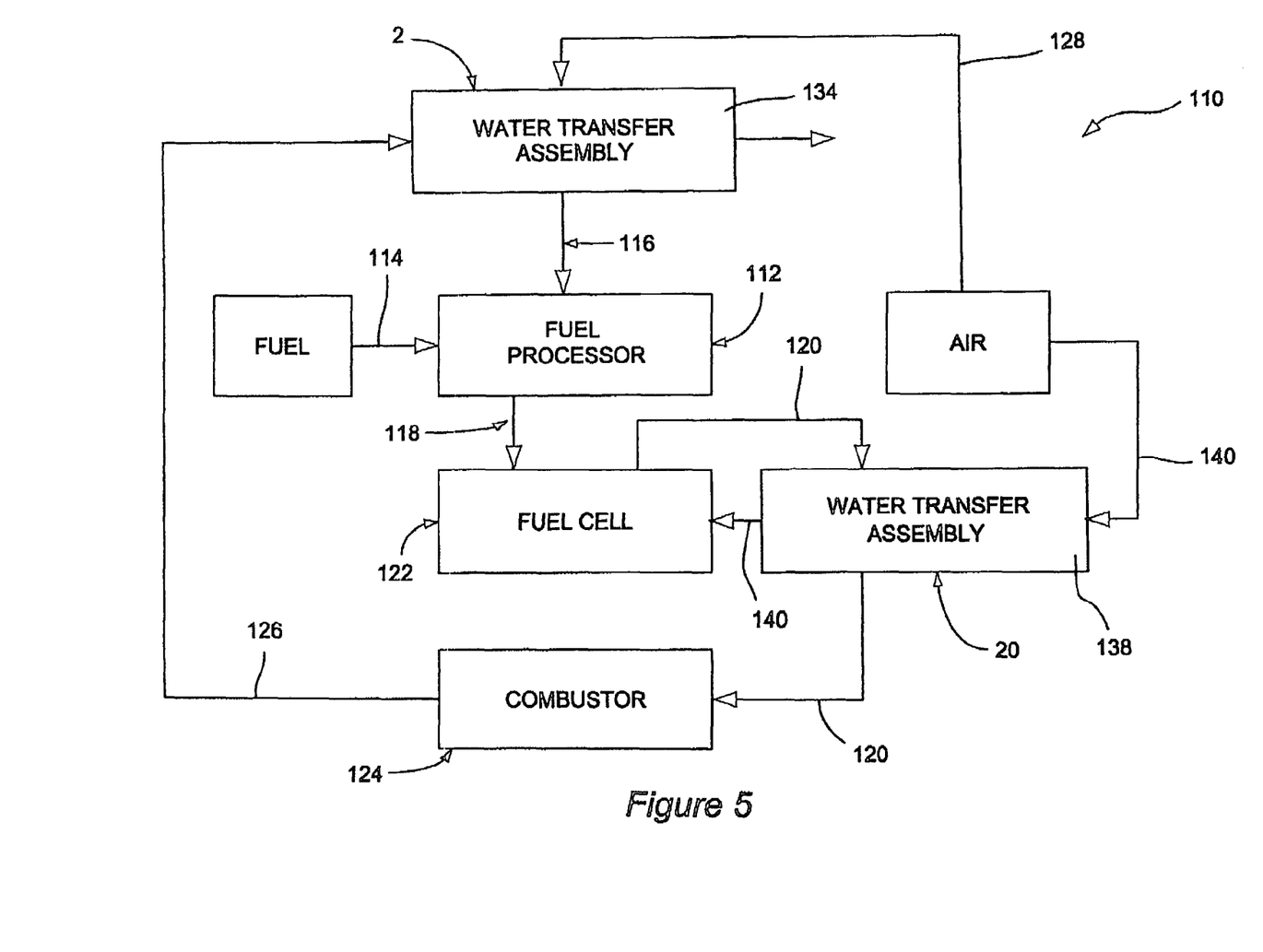
FIG. 5 is a diagram depicting a fourth embodiment of a hydrocarbon fuel reformer system according to the present invention connected to a fuel cell and providing for the use of two water transfer assemblies within the system.

A fourth embodiment is illustrated in FIG. 5. This fourth embodiment again provides a hydrocarbon fuel cell plant 110 comprising a fuel processor 112 for reacting a hydrocarbon fuel feed stream 114 and an oxidant feed stream 116 to produce a hydrogen-containing reformate stream 118. As in the second embodiment, the exhaust stream 120 from the fuel cell 122 is fed into a combustor 124 to consume any residual hydrogen or fuel vapor and produce a combustor exhaust stream 126. In this embodiment, however, prior to entering the combustor 124, at least a portion of the fuel cell exhaust stream 120, preferably at least the cathode exhaust stream, is fed into a second water transfer assembly 138 so that a portion of the water vapor in the fuel cell exhaust 120 can be transferred to at least one of the fuel cell feed streams, preferably the cathode feed stream 140.

The dehumidified fuel cell exhaust 120 is then fed into the combustor 124 to consume any residual hydrogen or fuel vapor and produce a combustor exhaust stream 126. In this fourth embodiment, the combustor exhaust stream 126 and an oxidant stream 128 may then both be fed into a water transfer assembly 134. The exhaust stream 126 and/or the oxidant stream 128 may pass directly into the water transfer assembly 134 or be conditioned by an intermediate heat exchanger as illustrated in FIG. 3. In the water transfer assembly 134, water vapor from the combustor exhaust 126 is again transferred to the oxidant stream 128 to produce a wet oxidant stream 116 that is fed into the fuel processor 112.

Figure 6:
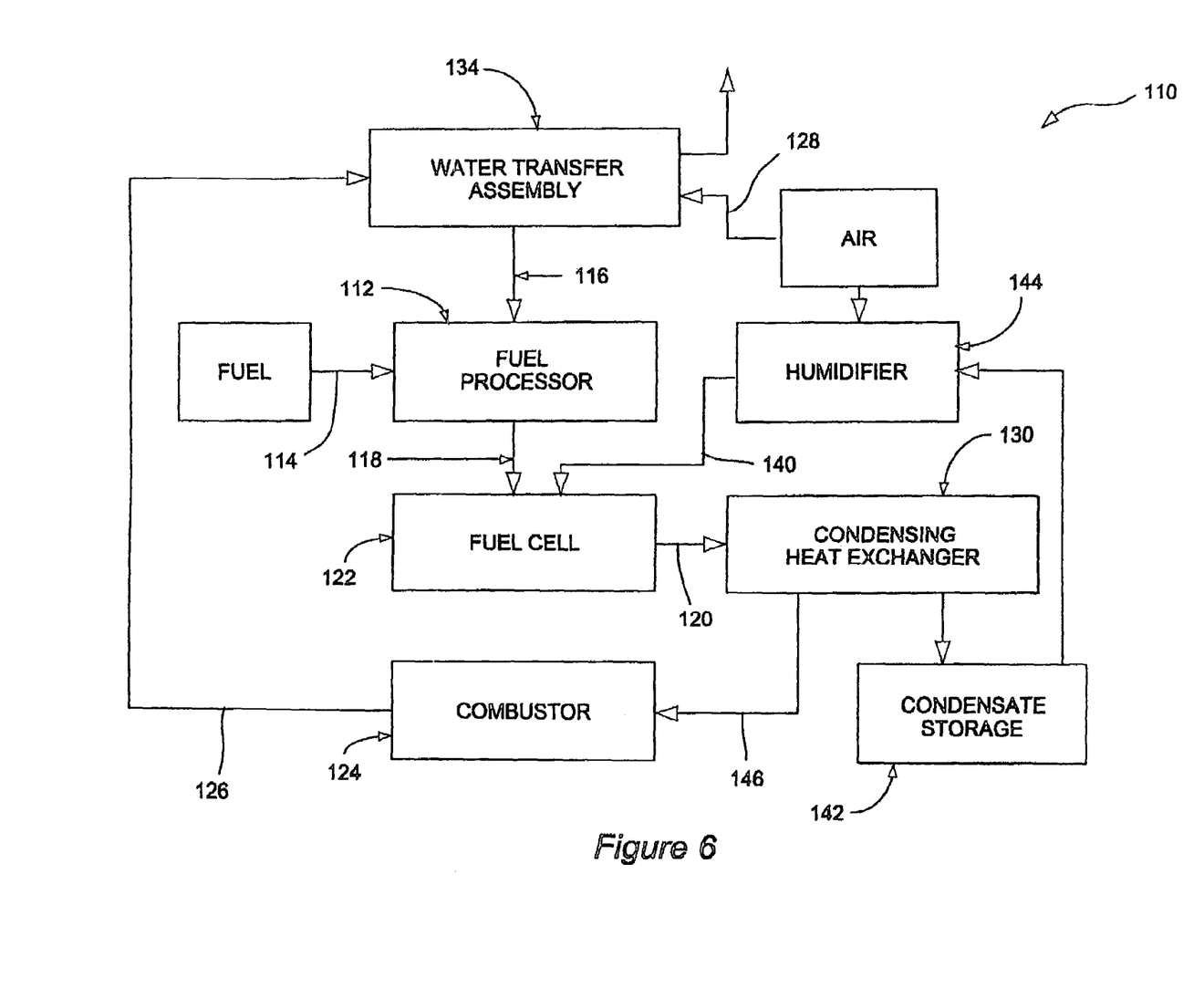
FIG. 6 is a diagram depicting a fifth embodiment of a hydrocarbon fuel reformer system according to the present invention connected to a fuel cell and providing for the use of both a water transfer device and a condensing heat exchanger.

A fifth embodiment is illustrated in FIG. 6. This fifth embodiment again provides a hydrocarbon fuel cell plant 110 comprising a fuel processor 112 for reacting a hydrocarbon fuel feed stream 114 and an oxidant feed stream 116 to produce a hydrogen-containing reformate stream 118. As in the second embodiment, the exhaust stream 120 from the fuel cell 122 is again fed into a combustor 124 to consume any residual hydrogen or fuel vapor and produce a combustor exhaust stream 126. In this embodiment, however, prior to entering the combustor 124, a portion of the fuel cell exhaust stream 120, preferably at least the cathode exhaust stream, is fed into condensing heat exchanger 130.

Within the condensing heat exchanger 130, the fuel cell exhaust stream 120 is cooled to below its dew point, inducing the condensation of water vapor present in the fuel cell exhaust stream 120 to form a condensate consisting primarily of water. The condensate is first transferred to a water reservoir 142 and then to a humidifier 144 where it is used to add water vapor to a fuel cell feed stream, preferably the oxidant feed stream 140. The dehumidified or dry fuel cell exhaust stream 146 is then fed into the combustor 124 to consume any residual hydrogen or fuel vapor and produce a combustor exhaust stream 126. In this fifth embodiment, the combustor exhaust stream 126 and an oxidant stream 128 may both be fed into a water transfer assembly 134, with or without passing through an intermediate heat exchanger. In the water transfer assembly 134, water vapor from the combustor exhaust 126 is again transferred to the oxidant stream 128 to produce a wet oxidant stream 116 that is fed into the fuel processor 112.

In each of the embodiments of the present invention described above, the fuel processor 112 is configured to convert a hydrocarbon fuel to hydrogen for use in a fuel cell. A skilled practitioner will appreciate that the present invention can be utilized in a variety of fuel processing applications which produce a humidified reformate stream or wet process stream. Preferred fuel processors include steam reforming reactors, autothermal reactors, and quasi-autothermal reactors as generally described above. Although described and illustrated as a single unit, the fuel processor 112 may comprise one or more reactors including a primary reactor, a water/gas shift (WGS) reactor, and a preferential oxidation (PrOx) reactor, that act in concert to convert a hydrocarbon fuel stream in the presence of water/steam to produce a hydrogen-containing reformate. Similarly, each of the individual reactors may include one or more sections or reactor beds or comprise one of a variety of known designs. Therefore, the selection, configuration and arrangement of the reactors for use in combination with the present invention is expected to vary depending on the system requirements and application.

Preferably, the various aspects of the operation of the system are controlled using a suitable microprocessor, microcontroller, programmable processing unit, etc., which has central processing unit capable of executing a control program and data stored in a memory. The controller may be a dedicated controller specific to any of the components, or implemented in software stored in a main electronic control module. Further, although software based control programs are usable for controlling system components in various modes of operation as described above, it will also be understood that the control can also be implemented in part or whole by dedicated electronic circuitry.

The present invention also provides a water transfer device that transfers water vapor from a wet process stream to a dry reactivation stream. The water transfer assembly of this invention comprises a structure providing segregated flow paths through portions of a desiccant matrix for both the process gas stream and the reactivation gas stream. The desiccant matrix is preferably sized and configured to provide sufficient water transfer capacity for the particular application, taking into account the volume, temperature, and water content of both the process stream and reactivation stream being utilized and the range of ambient conditions under which the system is intended to operate.

The present invention provides a series of embodiments incorporating one or more water transfer assemblies that reduce or eliminate the need for handling liquid water within the hydrocarbon fuel cell plant, reduce the power demands associated with the condensation and evaporation of water within the plant, and increase the range of ambient conditions suitable for operation.

The examples and other embodiments described herein are exemplary and not intended to be limiting in describing the full scope of apparatuses, devices, components, materials, compositions and methods of this invention. Equivalent changes, modifications, rearrangement, and variations of specific embodiments, materials, compositions, components, and methods may be made with substantially similar results.

What is claimed is:

1. A hydrocarbon fuel cell plant comprising:
  a hydrocarbon fuel source,
  an oxidant source;
  a reformer receiving a fuel stream of hydrocarbon fuel from the hydrocarbon fuel source and a first oxidant stream from the oxidant source and therein reacting the fuel stream and the first oxidant stream to produce a reformate stream;

a fuel cell receiving and reacting the reformate stream from the reformer and a second oxidant stream from the oxidant source to produce a fuel cell exhaust stream;

a combustor receiving and combusting the fuel cell exhaust stream to produce a combustor exhaust stream having water vapor therein; and a water transfer assembly configured to repeatedly expose a dry portion of a desiccant matrix to the combustor exhaust stream, thereby absorbing a portion of the water vapor from the combustor exhaust stream to form a wet portion in the desiccant matrix, and further configured to subsequently expose the wet portion to the first oxidant stream and release water vapor from the wet portion into the first oxidant stream and recover the dry portion of the desiccant, without any external source of water vapor being introduced to the first oxidant stream.

2. A hydrocarbon fuel cell plant according to claim 1, further comprising:

a heat exchanger receiving the combustor exhaust stream and the first oxidant stream and transferring heat energy from the combustor exhaust stream to the first oxidant stream, thereby cooling the combustor exhaust stream and heating the first oxidant stream, wherein the transfer of heat energy occurs before the combustor exhaust stream and the first oxidant stream enter the water transfer assembly.

3. A hydrocarbon fuel cell plant according to claim 2, wherein the water transfer assembly further comprises:

a desiccant matrix having a high surface area to volume material on which a desiccant is provided, a desiccant face adjacent the casing, and a plurality of gas channels through the desiccant matrix;

a casing segregating the desiccant face into a process zone and a reactivation zone, the process zone configured to receive the combustor exhaust stream and the reactivation zone configured to receive the first oxidant stream;

a rotor being arranged and configured to contain the desiccant matrix; and a rotor drive configured and arranged to move the rotor at a predetermined interval to expose a portion of the desiccant face sequentially to the process zone and the reactivation zone.

4. A hydrocarbon fuel cell plant according to claim 3, wherein:

the desiccant comprises a silica gel provided on a substrate.

5. A hydrocarbon fuel cell plant according to claim 3, wherein:

at least 85% of the water vapor from the combustion exhaust stream is transferred to the first oxidant stream within the water transfer assembly.

6. A hydrocarbon fuel cell plant according to claim 3, wherein:

the rotor drive may be adjusted to move the rotor assembly at a predetermined rate between a first rate and a second rate.

7. A hydrocarbon fuel cell plant according to claim 2, wherein the heat exchanger directly receives the combustor exhaust stream from the combustor.

8. A hydrocarbon fuel cell plant according to claim 1, wherein:

the reformer is selected from a group consisting of a steam reformer, an autothermal reformer, and a quasi-autothermal reformer.

9. A hydrocarbon fuel cell plant according to claim 1, wherein:

the reformer is an autothermal reformer having a primary reactor, a water/gas shift reactor, and a preferential oxidizer reactor.

10. A hydrocarbon fuel cell plant according to claim 1, wherein:

the reformer is a quasi-autothermal reactor having a thermal combustor, a catalytic combustor, a fuel/steam/air mixer, and a catalytic reformer.

11. A hydrocarbon fuel cell plant according to claim 1, wherein the combustor is in direct communication with the water transfer assembly.

12. A hydrocarbon fuel cell plant comprising:

a hydrocarbon fuel source, an oxidant source;

a reformer receiving a fuel stream of hydrocarbon fuel from the hydrocarbon fuel source and a first oxidant stream from the oxidant source and therein reacting the fuel stream and the first oxidant stream to produce a reformate stream;

a fuel cell receiving and reacting the reformate stream from the reformer and a second oxidant stream from the oxidant source to produce a fuel cell exhaust stream;

a combustor receiving and combusting the fuel cell exhaust stream to produce a combustor exhaust stream having water vapor therein;

a water transfer assembly configured to repeatedly expose a dry portion of a desiccant matrix to the combustor exhaust stream, thereby absorbing a portion of the water vapor from the combustor exhaust stream to form a wet portion in the desiccant matrix, and further configured to subsequently expose the wet portion to the first oxidant stream and release water vapor from the wet portion into the first oxidant stream and recover the dry portion of the desiccant;

a heat exchanger receiving the combustor exhaust stream and the first oxidant stream and transferring heat energy from the combustor exhaust stream to the first oxidant stream, thereby cooling the combustor exhaust stream and heating the first oxidant stream, wherein the transfer of heat energy occurs before the combustor exhaust stream and the first oxidant stream enter the water transfer assembly;

wherein the water transfer assembly further comprises:

a desiccant matrix having a high surface area to volume material on which a desiccant is provided, a desiccant face adjacent the casing, and a plurality of gas channels through the desiccant matrix;

a casing segregating the desiccant face into a process zone and a reactivation zone, the process zone configured to receive the combustor exhaust stream and the reactivation zone configured to receive the first oxidant stream;

a rotor being arranged and configured to contain the desiccant matrix; and a rotor drive configured and arranged to move the rotor at a predetermined interval to expose a portion of the desiccant face sequentially to the process zone and the reactivation zone, wherein:

the process zone is characterized by an area that may be adjusted in size between a first process zone area and a second process zone area; and the reactivation zone is characterized by an area that may be adjusted in size between a first reactivation zone area and a second reactivation zone area.

13. A hydrocarbon fuel cell plant according to claim 12, wherein:

the desiccant face is characterized by a desiccant face area substantially equal to the sum of the process zone area and the reactivation zone area.

14. A hydrocarbon fuel cell plant according to claim 13, wherein:
the ratio of the process zone area to the reactivation zone area are within a range of about 3:1 to 1:3.

15. A hydrocarbon fuel cell plant comprising:
a hydrocarbon fuel source,
an oxidant source;
a reformer receiving and reacting a fuel stream of hydrocarbon fuel from the hydrocarbon fuel source and a first oxidant stream from the oxidant source to produce a reformate stream;
a fuel cell receiving and reacting the reformate stream from the reformer and a second oxidant stream from the oxidant source to produce an anode exhaust stream and a cathode exhaust stream;
a combustor receiving and combusting the anode exhaust stream to produce a combustor exhaust stream having water vapor;
a first water transfer assembly configured to expose a dry desiccant of the first water transfer assembly to the combustor exhaust stream, thereby absorbing at least a portion of the water vapor from the combustor exhaust stream to form a wet desiccant, and subsequently to expose the wet desiccant to the first oxidant stream to release water vapor from the wet desiccant into the first oxidant stream and recover the dry desiccant, without any external source of water vapor being introduced to the first oxidant stream; and
a second water transfer assembly configured to expose a dry desiccant of the second water transfer assembly to the cathode exhaust stream, thereby absorbing at least a portion of the water vapor from the cathode exhaust stream to form a wet desiccant, and further configured to subsequently expose the wet desiccant to the second oxidant stream to release water vapor from the wet desiccant into the second oxidant stream and recover the dry desiccant.

16. A hydrocarbon fuel cell plant according to claim 15, further comprising:
a heat exchanger receiving the combustor exhaust stream and the first oxidant stream and therein transferring heat energy from the combustor exhaust stream to the first oxidant stream, thereby cooling the combustor exhaust stream and heating the first oxidant stream, wherein the transfer of heat energy occurs before the combustor exhaust stream and the first oxidant stream enter the first water transfer assembly.

17. A hydrocarbon fuel cell plant comprising:
a hydrocarbon fuel source,
an oxidant source;
a reformer receiving and reacting a fuel stream of hydrocarbon fuel from the hydrocarbon fuel source and a first oxidant stream from the oxidant source to produce a reformate stream;
a fuel cell receiving and reacting the reformate stream from the reformer and a second oxidant stream from the oxidant source to an anode exhaust stream and a cathode exhaust stream;
a condensing heat exchanger receiving at least one of the anode exhaust stream and the cathode exhaust stream and characterized by a dew point, cooling the exhaust stream to a temperature below a dew point and collecting a condensate;
a water reservoir receiving and holding the condensate from the condensing heat exchanger;
a humidifier receiving the second oxidant stream and a humidifying stream from the water reservoir to humidify the second oxidant stream before the second oxidant stream enters the fuel cell;
a combustor receiving and combusting at least the anode exhaust stream to produce a combustor exhaust stream; and
a water transfer assembly configured to expose a dry desiccant of the water transfer assembly to the combustor exhaust stream, thereby absorbing at least a portion of the water vapor from the combustor exhaust stream to form a wet desiccant, and further configured to subsequently expose the wet desiccant to the first oxidant stream to release water vapor from the wet desiccant into the first oxidant stream and recover the dry desiccant, without any external source of water vapor being introduced to the first oxidant stream.

18. A hydrocarbon fuel cell plant according to claim 17, further comprising:
a combustor fuel feed providing a hydrocarbon fuel to the combustor.

19. A hydrocarbon fuel cell plant according to claim 17, further comprising:
a heat exchanger receiving the combustor exhaust stream and the first oxidant stream and transferring heat energy from the combustor exhaust stream to the first oxidant stream, thereby cooling the combustor exhaust stream and heating the first oxidant stream, wherein the transfer of heat energy occurs before the combustor exhaust stream and the first oxidant stream enter the water transfer assembly.

20. A hydrocarbon fuel cell plant comprising:
a hydrocarbon fuel source;
an oxidant source;
a reformer receiving a fuel stream of hydrocarbon fuel from the hydrocarbon fuel source and a first oxidant stream from the oxidant source and therein reacting the fuel stream and the first oxidant stream to produce a reformate stream; and
a water transfer assembly configured to repeatedly expose a dry portion of a desiccant matrix to the reformate stream, thereby absorbing a portion of the water vapor from the reformate stream to form a wet portion in the desiccant matrix, and further configured to subsequently expose the wet portion to the first oxidant stream and release water vapor from the wet portion into the first oxidant stream and recover the dry portion of the desiccant.

* * * * *